United States Patent
Haley et al.

(10) Patent No.: US 7,861,110 B2
(45) Date of Patent: Dec. 28, 2010

(54) SYSTEM, METHOD, AND ADAPTER FOR CREATING FAULT-TOLERANT COMMUNICATION BUSSES FROM STANDARD COMPONENTS

(75) Inventors: Neil Haley, Hudson, MA (US); Paul Curtis, Sudbury, MA (US); Michael T. Ferrari, Shrewsbury, MA (US)

(73) Assignee: Egenera, Inc., Marlboro, MA (US)

( * ) Notice: Subject to any disclaimer, the term of this patent is extended or adjusted under 35 U.S.C. 154(b) by 350 days.

(21) Appl. No.: 12/112,836

(22) Filed: Apr. 30, 2008

(65) Prior Publication Data

US 2009/0276666 A1 Nov. 5, 2009

(51) Int. Cl.
*G06F 11/00* (2006.01)

(52) U.S. Cl. .................... 714/4; 714/43; 714/47

(58) Field of Classification Search ............... 714/4, 714/43, 47
See application file for complete search history.

(56) References Cited

U.S. PATENT DOCUMENTS

| | | | |
|---|---|---|---|
| 5,404,465 A * | 4/1995 | Novakovich et al. | 710/110 |
| 5,422,877 A * | 6/1995 | Brajczewski et al. | 370/228 |
| 7,188,202 B1 * | 3/2007 | Dorr et al. | 710/220 |
| 7,231,430 B2 | 6/2007 | Brownell et al. | |
| 7,730,362 B2 * | 6/2010 | Claus et al. | 714/47 |
| 2003/0115397 A1 * | 6/2003 | Hawkins et al. | 710/305 |
| 2006/0072531 A1 * | 4/2006 | Ewing et al. | 370/338 |
| 2006/0253726 A1 * | 11/2006 | Kukshya et al. | 714/4 |
| 2008/0086580 A1 * | 4/2008 | Zhang et al. | 710/107 |
| 2009/0006889 A1 * | 1/2009 | Holdaway et al. | 714/9 |

* cited by examiner

*Primary Examiner*—Marc Duncan
(74) *Attorney, Agent, or Firm*—Wilmer Cutler Pickering Hale and Dorr LLP

(57) ABSTRACT

A system, method, and adapter for creating fault-tolerant communication busses from standard components, are described. Fault-tolerant interface logic is provided for transmitting and receiving system health and system management signals to and from a module that is designed to be connected to a single RS-485 bus. The fault-tolerant interface logic enables the module to selectively communicate via at least two redundant half-duplex, multipoint, differential RS-485 busses. The fault-tolerant interface logic includes a first RS-485 transceiver connected to a first RS-485 bus, a second RS-485 transceiver connected to a second RS-485 bus, selector logic responsive to a control signal for selecting one of the first and the second busses to receive signals from and for transmitting the received signals to the module, and software logic executable on a baseboard management controller (BMC) chip. The software logic includes control logic for monitoring the health of the selected bus and for providing the control signal to the selector logic.

8 Claims, 9 Drawing Sheets

SYSTEM, METHOD, AND ADAPTER FOR CREATING FAULT-TOLERANT COMMUNICATION BUSSES FROM STANDARD COMPONENTS

FIELD OF INVENTION

The present invention in general relates to serial bus communications and in particular to fault-tolerant serial bus communication systems created from standard components.

BACKGROUND

Serial communication is common in telecommunications and computer systems. Data are sent sequentially, one bit at a time, on a single communication line. Serial communication is simple and often low-cost. There are now many standards for serial bus communication. Some of these standards are SPI, I²C, 1-Wire, Intelligent Chassis Management Bus (ICMB), Universal Serial Bus (USB), RS-232, RS-423, and RS-485. Many manufacturers create components, such as transceivers and control chips, in accordance with these standards. Consequently there is a wealth of competitively priced and reliable components for standard bussing arrangements.

One of these popular standards is RS-485, also known as EIA-485 standard, or ANSI/TIA/EIA-485-A-98 ("Electrical Characteristics of Generators and Receivers for Use in Balanced Digital Multipoint Systems", published by the American National Standards Institute, the Telecommunications Industry Association, and the Electronic Industries Alliance). The RS-485 standard is a physical layer standard used for half-duplex, multipoint, serial communication. Multiple nodes (alternatively called hosts, stations or devices) connect to a bus, but only one node transmits signals through the bus at a given instant. At that time each of the other nodes are in receiving mode, "listening" to the signals coming over the bus.

One type of bus that applies the RS-485 standard is the Intelligent Chassis Management Bus, or ICMB. ICMB can be used for communication among one or more central monitoring systems and multiple slots on a chassis, each of which may be occupied by a computer or another type of electronic system. Through the ICMB bus, the central system can monitor the status of each slot (whether occupied or not), and collect information from each occupied slot, for example regarding the board-number, temperature, fan-speed or power-consumption for each one of these systems connected to the bus. It can also send commands addressed to one of those systems (unicast) or a group of them (multicast) in order to, for example, reset them, or turn them on or off.

FIG. 1A is a system diagram for a system 100 using a multipoint, half duplex, serial bus. System 100 has a bus 110 connected to multiple nodes 113, two of which are shown.

Bus 110 is a multipoint serial bus, built and operating according to the RS-485 standard. Signals can be sent on the bus by each node connected to the bus and can be received by all nodes connected to the bus, as known in the art.

Each node 113 can for example be a computer, or another module, e.g. an Egenera processor blade within an Egenera blade frame system. The node includes a transceiver 106, a Baseboard Management Controller (BMC) 103, and a node logic 104.

The BMC 103 is a commodity chip. In this case it includes a UART (universal asynchronous receiver/transmitter) unit 105 which is responsible for transforming internal parallel signals to the serial binary signals to be transmitted out to the bus 110, and vice versa. Typically, BMC (and associated software) includes all the logic needed for communication with the bus 110.

Transceiver 106 is a commodity bus interface built in accordance with the RS-485 standard. It is responsible for transmitting signals to the bus and receiving signals from the bus. It transforms serial binary signals received from the UART to bus signals and transmits them on the bus 110. It also transforms differential signals received on bus 110 into serial binary signals and sends them to the UART 105.

The node logic 104 represents arbitrary logic or processors that the node 113 may contain in addition to a BMC. It may for example be a processor and memory.

Communication signals from the node are sent to the UART for example in the form of parallel signals. The UART transforms these signals into a serial binary signal and sends them to transceiver 106. The transceiver transforms these serial binary signals into a format used by the bus (e.g., differential signal) as defined by the standard, and transmits them to the bus 110. On the other hand, signals coming over the bus in the form of differential signals are received and transformed by the transceiver into serial binary signals and sent to the UART, which in turn transform them into parallel signals.

FIG. 1B is a high level physical diagram of system 100 shown in FIG. 1A. It details the structure of the bus and its connections to the nodes. The system includes two differential signal wires 110a and 110b and nodes 113, each connected to the two signal wires. The two signal wires 110a and 110b together represent the bus 110 in FIG. 1A.

Differential signals transmitted on the bus are in the form of a voltage difference ΔV between the two wires 110a and 110b. To send a signal, each node 113, through its transceiver 106, can introduce a voltage difference ΔV between the two wires. All other nodes will receive the voltage difference through their transceivers. In some implementations one of the nodes, designated as a master controller, is the only node that initiates a signal on the bus, and other nodes typically listen for differential signals.

FIG. 1C is a signal diagram depicting exemplary signal waveforms in an RS-485 bus. The vertical direction represents the voltage level and the horizontal direction represents time. The two waveforms labeled as 110a and 110b respectively represent the voltage levels in the two bus wires 110a and 110b. Three types of time periods are distinguished: time periods with no signal, marked as idle; time periods with a signal representing 1; and time periods with a signal representing 0. During the idle periods the voltages are at quiescent levels. Once voltages are introduced on the wires, such that the absolute value of ΔV exceeds the threshold value $V_{th}$, it is interpreted as a binary signal. In the example of FIG. 1C, whenever the voltage in wire 110a is more than that of wire 110b by an amount $V_{th}$, the signal is interpreted as a binary 1. Likewise, whenever the voltage in wire 110a is less than that of wire 110b by an amount $V_{th}$, the signal is interpreted as a binary 0.

The RS-485 multipoint busses are susceptible to total failures in the event of certain kinds of faults. For example, if any transceiver causes a short circuit between the two signal wires (a short circuit fault), the entire bus will be short-circuited, and no nodes can communicate through that bus. Alternatively, if due to a failure, a transceiver continuously drives a signal onto the signal wires of the bus (continuous drive fault), no other transceiver can override it, and again the entire bus will be rendered nonfunctional. These kinds of faults disrupt the differential signaling, and render the entire bus structure unusable by all nodes, since they can not detect the information.

SUMMARY OF THE INVENTION

The invention provides a system, method, and adapter for creating fault-tolerant communication busses from standard components.

According to one aspect of the invention, a fault-tolerant interface logic for transmitting and receiving system health and system management signals to and from a module that is designed to be connected to a single RS-485 bus, enables the module to selectively communicate via at least two redundant half-duplex, multipoint, differential RS-485 busses. The fault-tolerant interface logic includes a first RS-485 transceiver connected to a first RS-485 bus, a second RS-485 transceiver connected to a second RS-485 bus, selector logic responsive to a control signal for selecting one of the first and the second busses to receive signals from and for transmitting the received signals to the module, and software logic executable on a baseboard management controller (BMC) chip. The software logic includes control logic for monitoring the health of the selected bus and for providing the control signal to the selector logic.

According to another aspect of the invention, the selector logic receives signals from the module and transmits a first copy of the signals to the first RS-485 transceiver for delivery on the first RS-485 bus, and transmits a second copy of the signals to the second RS-485 transceiver for delivery on the second RS-485 bus.

According to another aspect of the invention, the control logic autonomously determines health of the selected RS-485 at least in part based on signal activity on the selected RS-485 bus.

According to another aspect of the invention, the control logic monitors the selected RS-485 bus and marks it as non-healthy if it does not detect signal activity within a predetermined time period.

According to another aspect of the invention, each of the first and the second RS-485 busses is an Intelligent Chassis Management Bus (ICMB) utilized by the module to transmit and receive system health and management signals.

According to another aspect of the invention, the system health and management signals include information about the module. The information can be board-number information, temperature information, fan-speed information, power-consumption information, or on/off status information.

According to another aspect of the invention, the system health and management signals include a command. The command can be a turn-on command, or a turn-off command.

According to another aspect of the invention, a fault-tolerant interface logic connects a module to at least two system busses. The fault-tolerant interface logic includes a first transceiver connected to a first bus, a second transceiver connected to a second bus, selector logic responsive to a control signal for selecting one of the first and the second busses to receive signals from and for transmitting the received signals to the module, and control logic for monitoring the health of the selected bus and for providing the control signal to the selector logic. The selector logic receives signals from the module and transmits a first copy of the signals to the first transceiver for delivery on the first bus and a second copy of the signals to the second transceiver for delivery on the second bus. The control logic autonomously determines health of the selected bus based on activity on the selected bus and causes selection of a bus other than the selected bus if it determines that the selected bus is not healthy.

According to another aspect of the invention, a fault-tolerant communication system for communication between a control module and a processing module that are each designed to be connected to a single RS-485 bus, enables the control module and the processing module to selectively communicate via at least two redundant half-duplex, multipoint, differential RS-485 busses. For each of the control and the processing modules, the fault-tolerant communication system includes a first RS-485 transceiver connected to a first RS-485 bus, a second RS-485 transceiver connected to a second RS-485 bus, selector logic responsive to a control signal for selecting one of the first and the second busses to receive signals from and for transmitting the received signals to the respective module, and software logic executable on a baseboard management controller (BMC) chip. The software logic includes control logic for monitoring the health of the respectively selected bus and for providing the control signal to the respective selector logic. The control module delivers test signals within a predetermined time period on the first and second busses to test the electrical connectivity of each of the two busses. The selector logic of the processing module monitors test signals received on the respectively selected bus and causes selection of a bus other than the respectively selected bus, if it does not receive test signals on the respectively selected bus within the predetermined time period.

According to another aspect of the invention, each selector logic receives signals from the respective module and transmits a first copy of the signals to the first RS-485 transceiver for delivery on the first RS-485 bus and a second copy of the signals to the second RS-485 transceiver for delivery on the second RS-485 bus.

According to another aspect of the invention, the test signals are able to cause a voltage difference on a healthy RS-485 bus to transit from a quiescent state to an active state in which the voltage difference represents a binary 0 or a binary 1 signal.

According to another aspect of the invention, a method of providing fault-tolerant communication between a control module and a processing module that are each designed to be connected to a single RS-485 bus, enables the control module and the processing module to selectively communicate via at least two redundant half-duplex, multipoint, differential RS-485 busses. The method includes each of the two modules delivering signals on each of the two busses by transmitting a first copy of the delivered signals on the first bus, and a second copy of the delivered signals on the second bus; each of the two modules selecting one of the first and the second busses to receive signals from; the control module delivering test signals within a predetermined time period on the first and second busses to test the electrical connectivity of each of the two busses; and the processing module monitoring test signals received on the respectively selected bus and switching to receiving signals from a bus other than the respectively selected bus, if it does not receive test signals on the respectively selected bus within the predetermined time period.

According to another aspect of the invention, the method of providing fault-tolerant communication between a control module and a processing module further includes the steps of the control module delivering a switch-command signal on each of the two busses and the processing module receiving the switch-command signal on the respectively selected bus and switching to receiving signals from a bus other than the respectively selected bus.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Preferred embodiments of the invention provide a system, method and adapter for creating fault-tolerant communication busses using standard components. Preferred embodiments of the invention provide an interface for connecting to multiple busses. The interface is made from standard components not originally designed for fault tolerance. The fault-tolerant system can sustain its operation by detecting a failure in a bus and in response switching to another bus. According to some embodiments, each node can autonomously detect a failure and decide to switch to another bus. In some embodiments, some central nodes send out regular heartbeat-like signals to inform other nodes of the health of the busses or to instruct them to switch busses. Certain embodiments of the invention provide fault tolerance at the cost of an extra (low-cost) transceiver, and modifications to the BMC code.

Figure 2A:
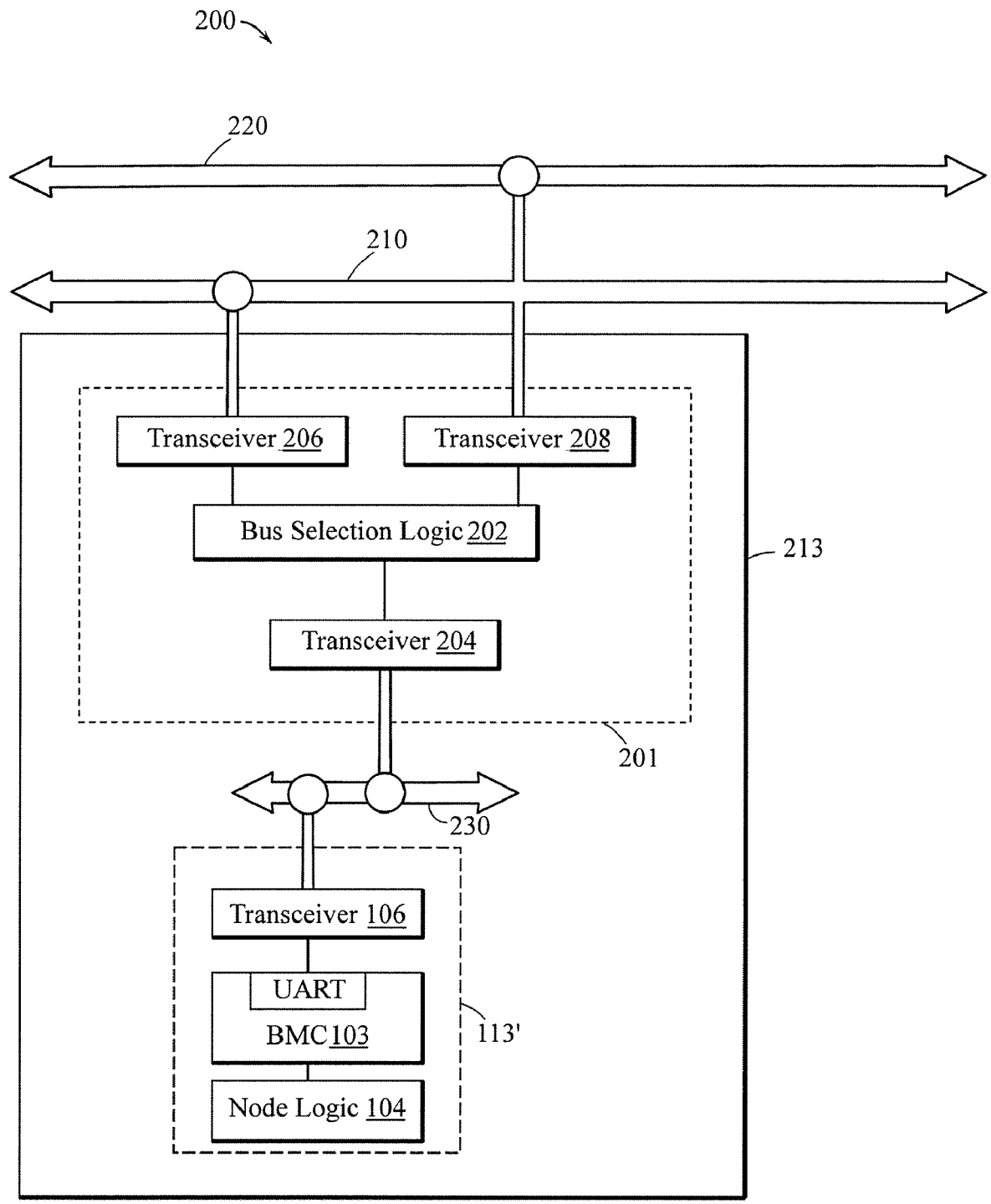
FIG. 2A is a system diagram for a system designed according to an embodiment of the invention.

FIG. 2A is a system diagram for a system 200 designed according to an embodiment of the invention. System 200 includes two redundant system busses 210 and 220, and a node 213 in communication with the two system busses. There can be multiple nodes connected to the two system busses, each via a mechanism similar to that shown in FIG. 2A. One is shown for illustrative purposes.

Figure 1A:
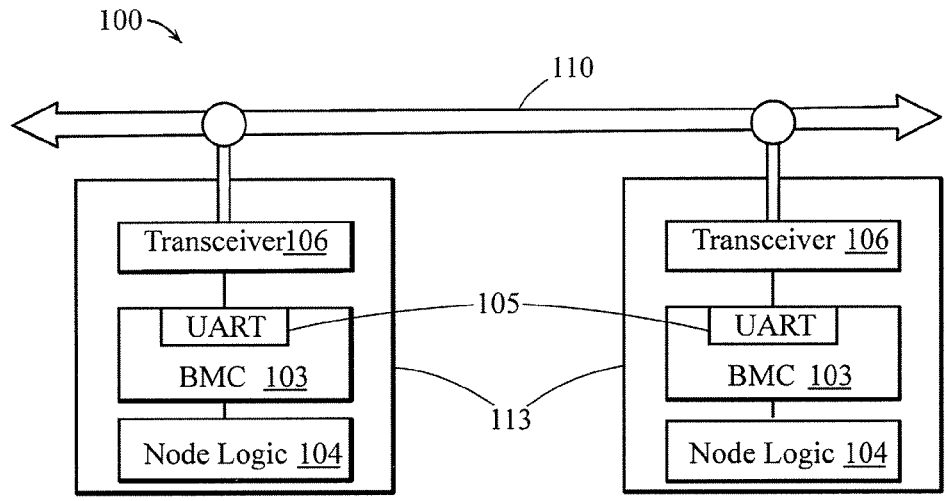
FIG. 1A is a system diagram for a system utilizing a bus according to the RS-485 standard.
Figure 1B:
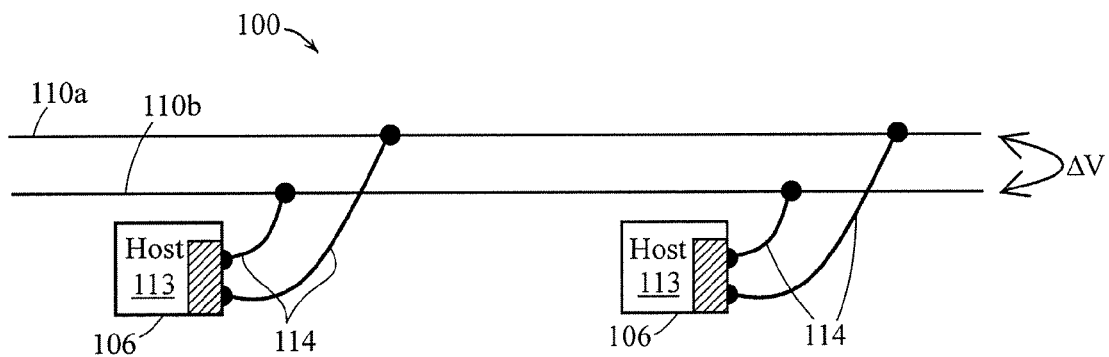
FIG. 1B is a schematic of a physical diagram of a system utilizing a bus according to the RS-485 standard.
Figure 1C:
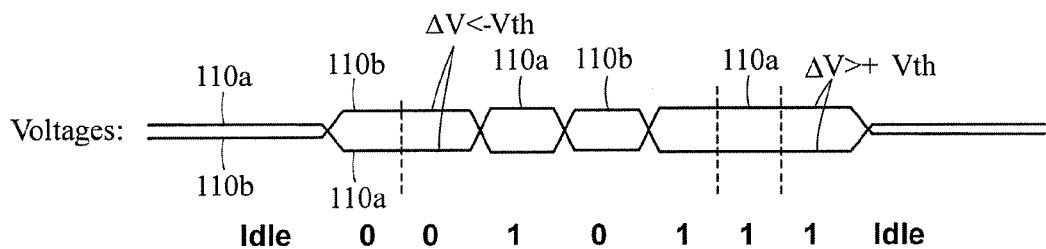
FIG. 1C is a high level signal diagram for a bus according to the RS-485 standard.

System busses 210 and 220 can each be an RS-485 bus similar to bus 110 shown in FIGS. 1A and 1B.

Node 213 includes a legacy portion 113', which is identical to the legacy node 113 in FIGS. 1A and 1B; that is, no change to the legacy node is needed when used in system 200. Node 213 also includes an internal bus 230, and interface logic 201. In FIG. 2A, two system busses are connected to each legacy portion 113' through the interface logic 201 and the internal bus 230. Internal bus 230 can be an RS-485 serial bus similar to bus 110 shown in FIG. 1A. There are only two nodes using internal bus 230, one is legacy portion 113' and the other is interface logic 201. Transceiver 106 sends and receives signals through the internal serial bus 230.

Whenever legacy portion 113' sends out a signal to the internal bus 230, typically interface logic 201 duplicates that signal and sends it out on both system busses 210 and 220. On the other hand, the interface logic 201 typically selects one of the two system busses for "listening." That is, whenever the interface logic receives a signal on the selected bus, it transfers the signal to the legacy portion via the internal bus.

The interface logic 201 includes Bus Selection Logic 202 and three multipoint serial transceivers 204, 206, and 208. These transceivers operate like the standard transceiver used in legacy portion 113'. Transceiver 204 connects to the internal bus 230. Transceivers 206 and 208 (called bus transceivers) each connect to one of the system busses 210 and 220. The Bus Selection Logic 202 selectively interconnects the bus transceivers to transceiver 204. Whenever Bus Selection Logic 202 receives a signal from transceiver 204, it duplicates and sends it to both bus transceivers 206 and 208. Bus Selection Logic 202 can also select one of bus transceivers 206 and 208 and transfer signals received by that selected transceiver to transceiver 204.

Figure 2B:
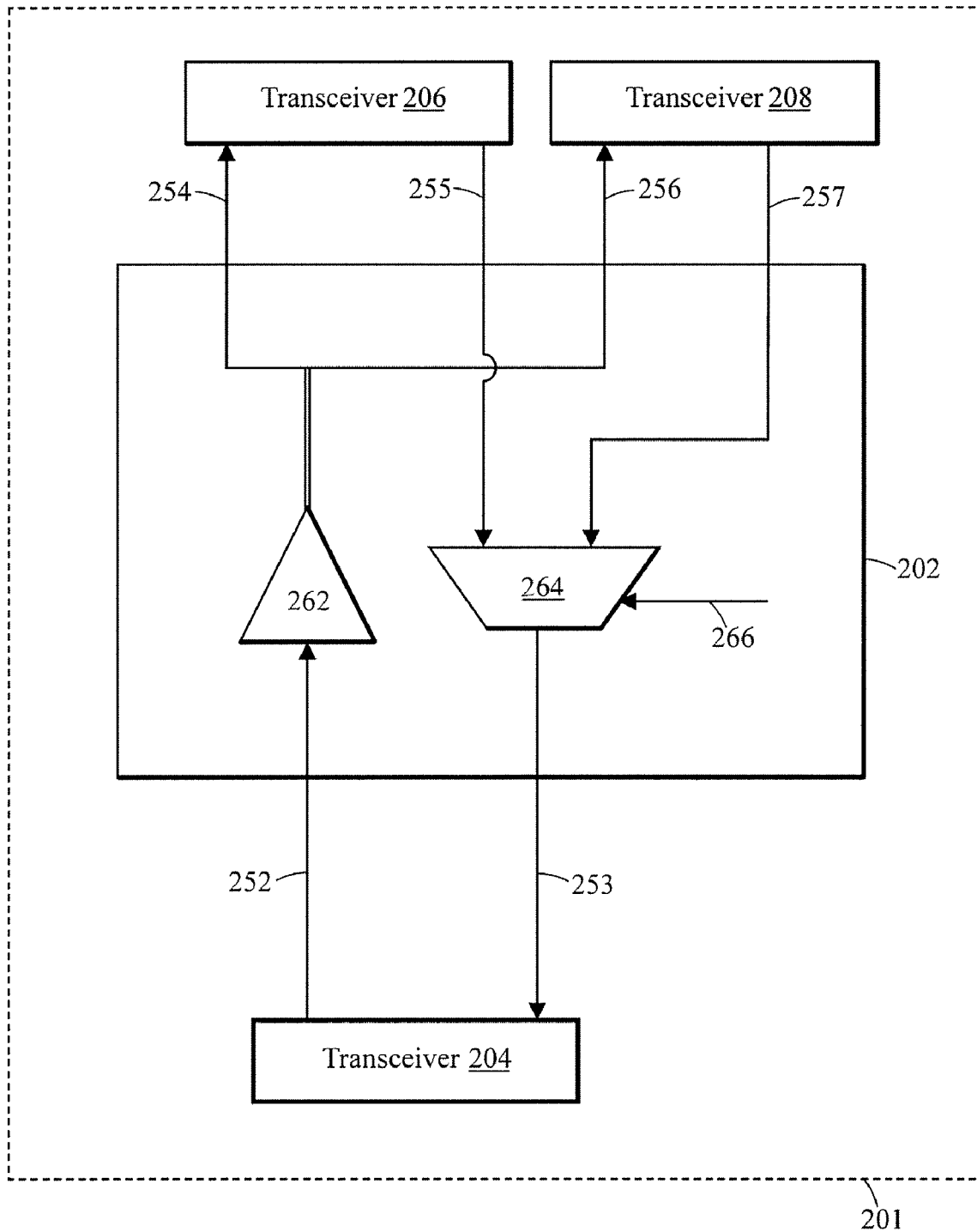
FIG. 2B is a system diagram for the logic designed according to an embodiment of the invention.

FIG. 2B is a system diagram, showing the interface logic 201 in more detail. The diagram shows transceiver 204 and the bus transceivers 206 and 208 and the Bus Selection Logic 202 as well as the direction of signals exchanged between these components. Specifically the Bus Selection Logic can receive signal 252 from transceiver 204 and can duplicate it into two signals 254 and 256 and transmits them to bus transceivers 206 and 208 respectively. Bus Selection Logic 202 can also receive signals 255 and 257 from bus transceivers 206 and 208 and selectively transmit one of them as signal 253 to transceiver 204.

Bus Selection Logic 202 includes a fanout unit 262 and a multiplexer unit 264. In its normal mode of operation, the fanout unit is responsible for duplicating the signal 252 received from transceiver 204 into two signals 254 and 256 and transmitting each to one of the bus transceivers. Multiplexer unit 264 typically selects one of the two bus transceivers and "listens" to it transmitting signals received on that selected transceiver to transceiver 204. Multiplexer 264 can also include a mechanism to switch from listening to one bus to listening to the other bus based on selection signal 266.

Selection signal 266 can for example be sent by a BMC based on the results of bus health checks.

In preferred embodiments, the BMC can perform regular health checks on the selected bus, and if it finds a failure in the selected bus, it can send a signal 266 to the interface logic 201 in order to switch to listening to the other bus. There are different types of health checks that may be performed on the bus, according to different embodiments of the invention. For example in some embodiments, the interface logic can keep track of the time elapsed since the last time it received some valid traffic on that bus, or since it switched to listening to that bus if it hasn't received any valid traffic yet. If the elapsed time exceeds some preset timeout period, it can switch to listening to the other bus.

Figure 2C:
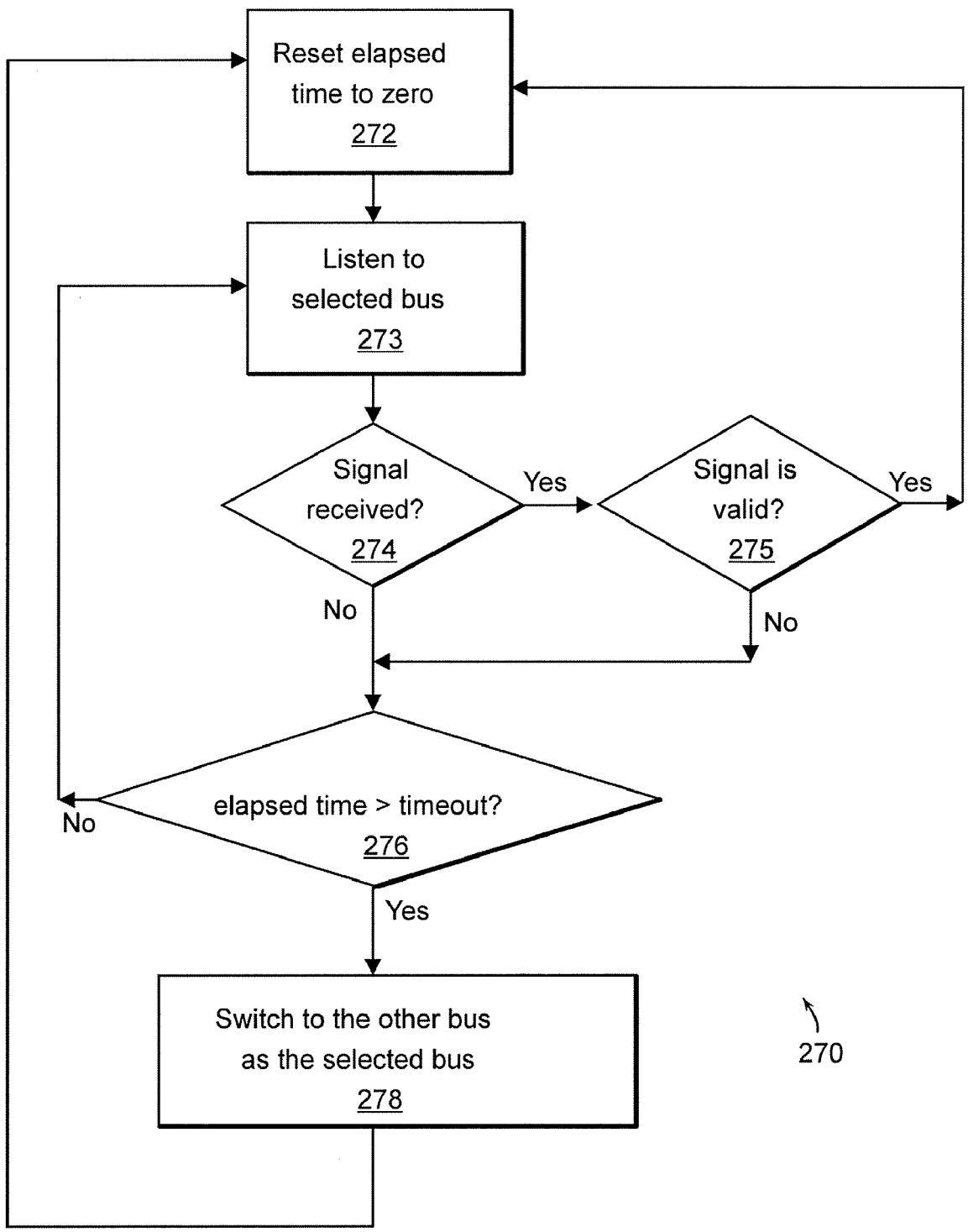
FIG. 2C is a flow chart of the health check cycle according to some embodiments of the invention.

FIG. 2C is a flow chart 270 of a health check cycle, performed at regular time intervals according to some embodiments of the invention. During each cycle the interface logic listens to the presently selected bus (273). If during this time it receives a signal on that bus (274), the interface logic checks whether it is a valid signal (275). A valid signal can be defined as a signal that satisfies some acceptance criteria based on the specific embodiment of the invention. If the signal is valid, the interface logic resets the elapsed time monitor to zero (272) and returns to the start of the cycle, listening to the selected bus for the next cycle (273). If the signal is not valid, or no signal has been received at the end of the cycle, the system checks the total elapsed time (276). If the elapsed time has not yet surpassed the timeout period, the interface logic continues to listen to the selected bus (273). Otherwise, if the elapsed time has surpassed the timeout period, the interface logic switches over to listening to another one of the redundant busses through the transceiver connected to that bus (278). The elapsed time monitor is reset to zero (272) and the interface logic starts a new cycle listening to the newly selected bus (273).

Figure 2D:
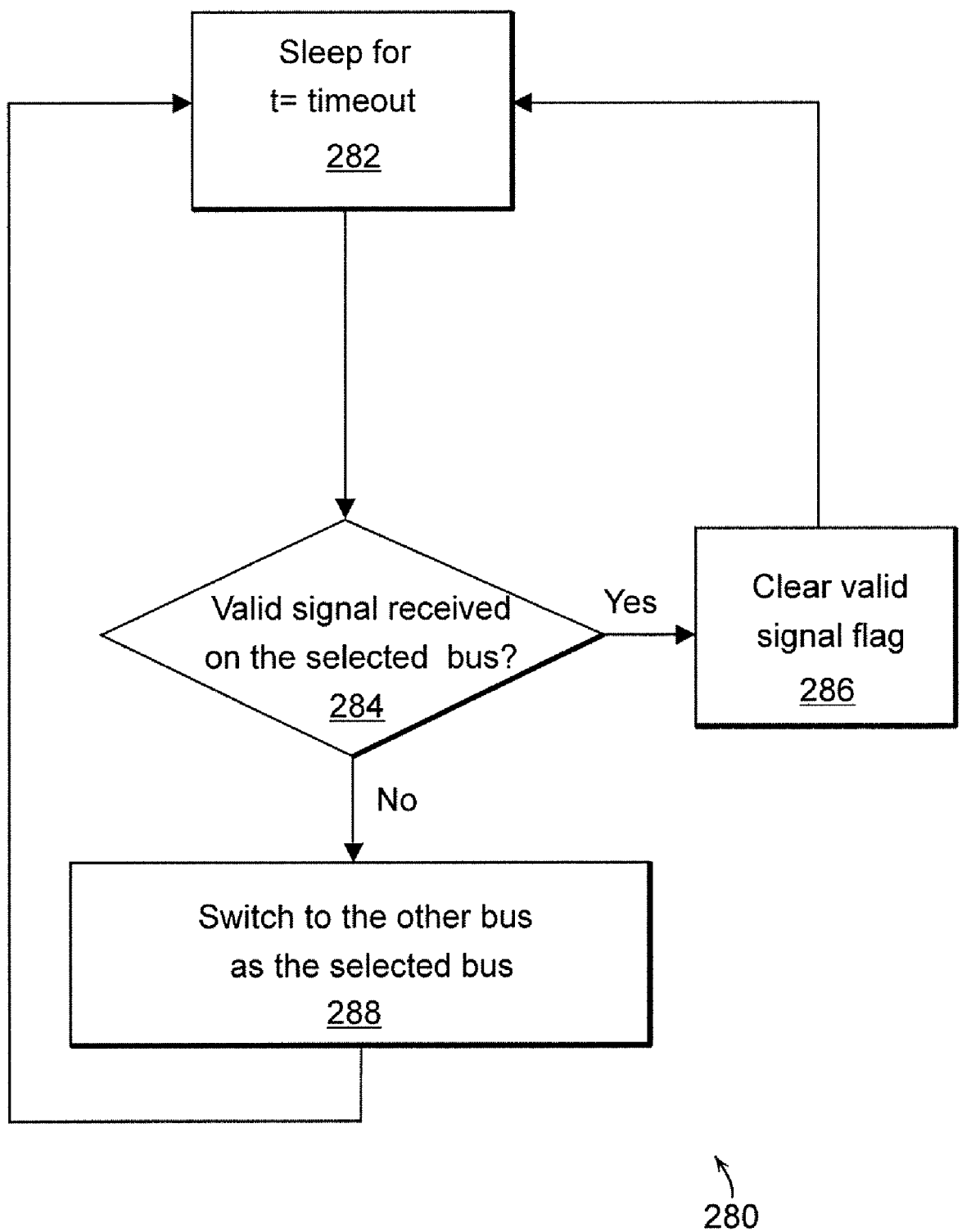
FIG. 2D is another flow chart of the health check cycle according to preferred embodiments of the invention.

FIG. 2D is a different flow chart 280 of a health check cycle according to some preferred embodiments of the invention. There are at least two threads running on BMC 103, the traffic thread and the monitor thread. The traffic thread is responsible for receiving and processing signals received on the selected bus. The monitor thread is responsible for monitoring the health of the busses and triggering the switching of the busses if necessary. Whenever the traffic thread receives a valid signal, it sets a corresponding "valid signal flag" to be read by the monitor thread. The flow chart 280 shows a heath check cycle performed by the monitor thread in periods equal to the timeout period. At the start of each cycle the monitor thread waits for a period of time equal to the timeout period (282). It then checks whether any valid signal has been received by the traffic thread, by checking the valid signal flag (284). If the flag has been set, meaning that the traffic thread has received some valid traffic on the selected bus, the monitor thread will clear the valid signal flag (286), and starts a new cycle (282). Otherwise, if the traffic thread has not received any valid signal, the monitor thread switches to the other bus (288) and starts a new cycle (282).

According to various embodiments the timeout period in flow charts 270 and 280, as well as the acceptance criteria can be chosen by system designers to fit the anticipated traffic pattern or the nature of the system. In some embodiments of the invention the criteria can be that any signal is valid and the time out period can be one minute. In this case the interface logic will switch to listening to another bus if it does not receive any signal on the bus for a minute. Yet in some other embodiments of the invention the acceptance criteria is a specific algorithm applied to the signal.

In some embodiments of the invention, the mechanism for the bus health check is defined such that each interface logic 201 through its own Bus Selection Logic 202 is able to determine the health of any of the busses it is connected to in an autonomous way, independent of any other part of the system. Some embodiments of the invention perform the bus health check without using a pre-defined time out. In some embodiments, the interface logic of one or more nodes is also responsible for sending valid messages or checking for valid messages or both. In some embodiments of the invention one or more "master" nodes are responsible for sending a specific type of signal, called the health check signal or heartbeat, over one or more of the busses. These signals can be sent at regular intervals, or each signal might inform the receivers of the time the next signal will be sent. The other nodes will listen to their selected bus for receiving the heartbeat at the expected time, and if they don't receive it, they can assume the bus has failed and can switch to listening to another bus. In some embodiments, the health check signal might also include commands from the master as to which "preferred" bus the other nodes must be listening to. In some embodiments, all receiving nodes are expected to switch to the preferred bus. In other embodiments, the nodes will combine this information with their own records of bus health checks and make a decision whether to switch to the preferred node or not.

In system 200 of FIG. 2A, each node 213 transmits signals on both multipoint serial busses 210 and 220, and listens to signals from one of them. As long as there are no failed components, regardless of which bus any node 213 listens to, each node will receive all transmissions. On the other hand when a component fails, the outcome will depend on what has failed and how it has failed. If one of the legacy portions 113' fails, then it cannot perform its function. This failure may not always cause either of the redundant busses 210 and 220 to become non-functional, because the legacy portion 113' is not directly connected to either of these busses. This can be true even when a node experiences faults like the short circuit or the continuous drive faults. In some preferred embodiments, transceiver 204, or the bus transceivers, or both sets of transceivers, will prevent such failures from affecting either of the two busses. Even in the event of such failures in the legacy portion inside one node, all other nodes that are functional can continue to communicate and to function normally utilizing both busses. The same is true if transceiver 204 of the interface logic 201 fails. This failure can disconnect the corresponding legacy portion 113' from the two busses and its node from the rest of the nodes, but because the Bus Selection Logic 202 and the bus transceivers shield the failed transceiver 204 from the two busses, this failure does not always affect the other nodes or either of the two busses 210 and 220.

In case one of the bus transceivers 206 or 208 in one of the nodes fails, it may or may not experience a type of fault that renders non-functional the entire multipoint serial bus attached to the faulty transceiver. If the fault does not render the bus non-functional, then all other nodes in the system will continue to communicate and to function normally utilizing both busses. On the other hand, if the fault does render the bus non-functional, then all nodes that are currently listening to that bus will cease receiving valid traffic. This situation can trigger the bus switching mechanism in the interface logic of those nodes. For example after the specified timeout period, those interface logic will automatically switch to listening to the other bus. Normally the bus to which they switch is unaffected by the current failure and thus, using the new bus, all the other nodes in the system will be able to communicate normally with each other. In this case even the node with the faulty transceiver may continue functioning and communicating with outside world through its other, non-faulty, transceiver.

Figure 3A:
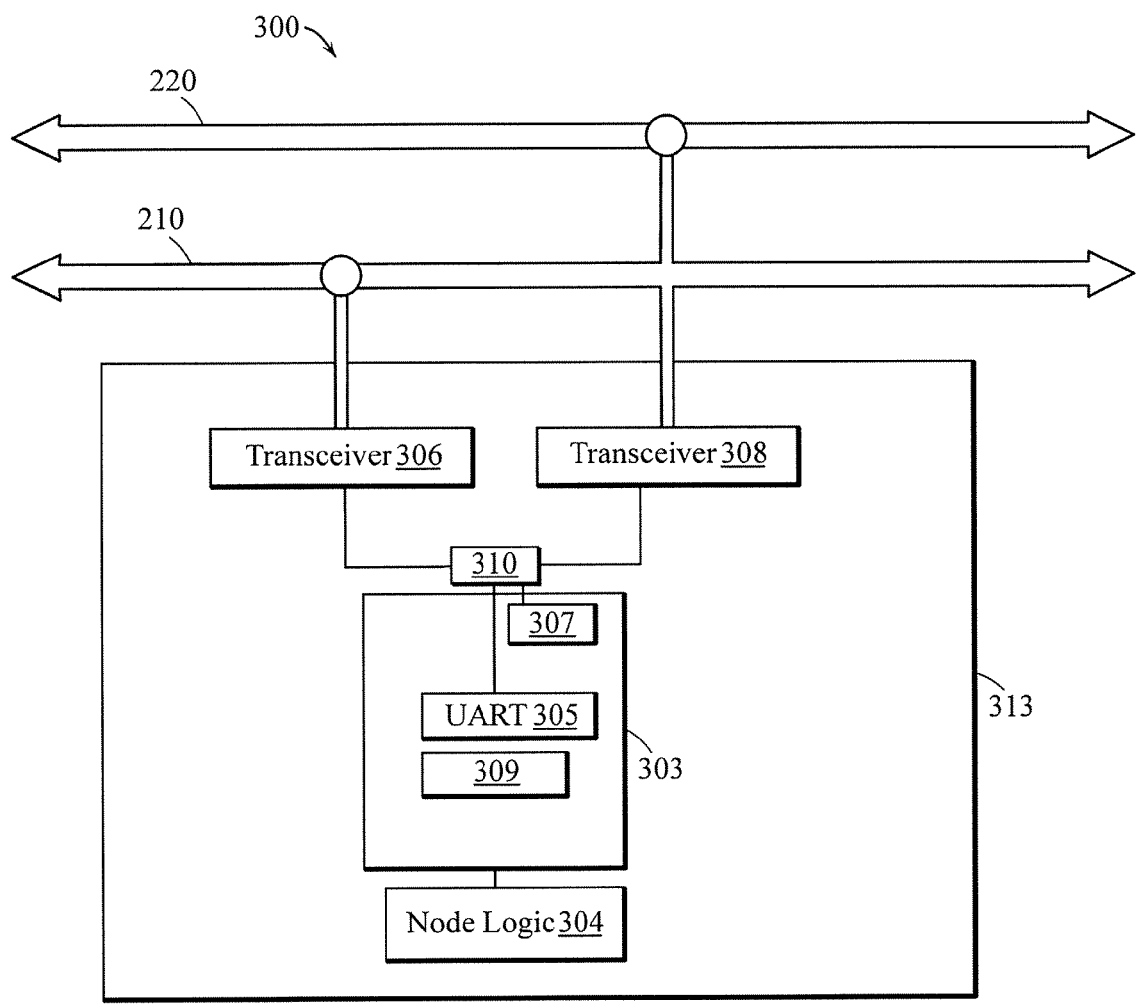
FIG. 3A is a system diagram for a system designed according to preferred embodiments of the invention.

FIG. 3A is a system diagram for a system 300 designed according to a preferred embodiment of the invention. System 300 includes two redundant system busses 210 and 220 connected to a node 313. The system busses can be connected to multiple nodes, each via a mechanism similar to that shown in FIG. 3. System 300 can for example be an Egenera hardware platform in which the control nodes communicate with the processing nodes on a chassis via two ICMB busses.

System busses 210 and 220 in FIG. 3A can be similar to the system busses in FIG. 2A. The system busses can for example be ICMB busses.

Node 313 can be a computer, or an Egenera blade built as a processing node or as a control node, whose bus interface has been modified according to a preferred embodiment of the invention. It has node logic 304, BMC 303, fanout-multiplexer unit 310, and two bus transceivers 306 and 308. The node logic operates similar to the node logic in FIG. 2A. Also the bus transceivers are commodity transceivers similar to those in FIG. 2A.

The BMC 303 can be a commodity BMC. The BMC components are divided into three sections, a UART 305, a shared unit 307 and a non-shared unit 309. The UART 305 operates similar to the UART in FIG. 2A. The shared unit 307 includes components like General Purpose Input/Output (GPIO) units, parts of BMC firmware and BMC clock. BMC shared unit 307 could be running some code specifically added to the BMC to perform the health check and switching algorithms. The non-shared unit 309 represents all other components in BMC, aside from the UART and the shared unit.

The fanout-multiplexer unit 310 is responsible for transmitting signals between the UART and the two bus transceivers. The fanout-multiplexer unit 310 can receive some of its inputs from the shared unit 307.

Whenever BMC 303 sends out a signal through its UART, typically the fanout-multiplexer unit 310 receives and duplicates that signal and transmits it to both bus transceivers 306 and 308. On the other hand the fanout-multiplexer unit 310 typically selects one of the two system busses and "listens" to it.

Figure 3B:
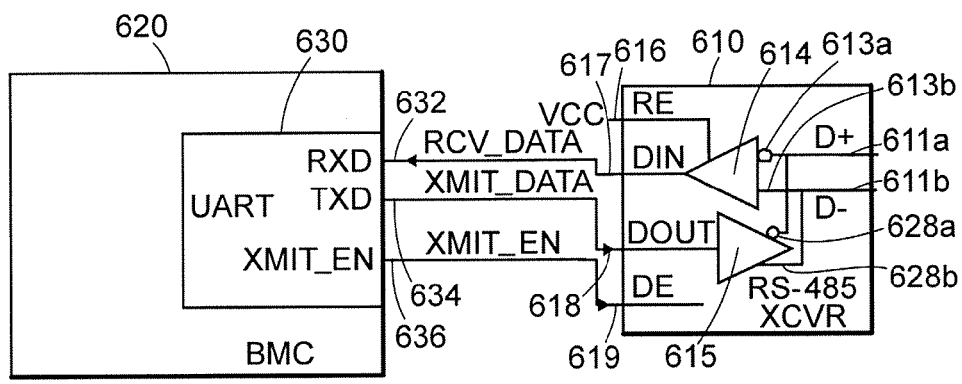
FIG. 3B is a circuit diagram of a system for connecting to a single bus in accordance to the RS-485 standards.
Figure 3C:
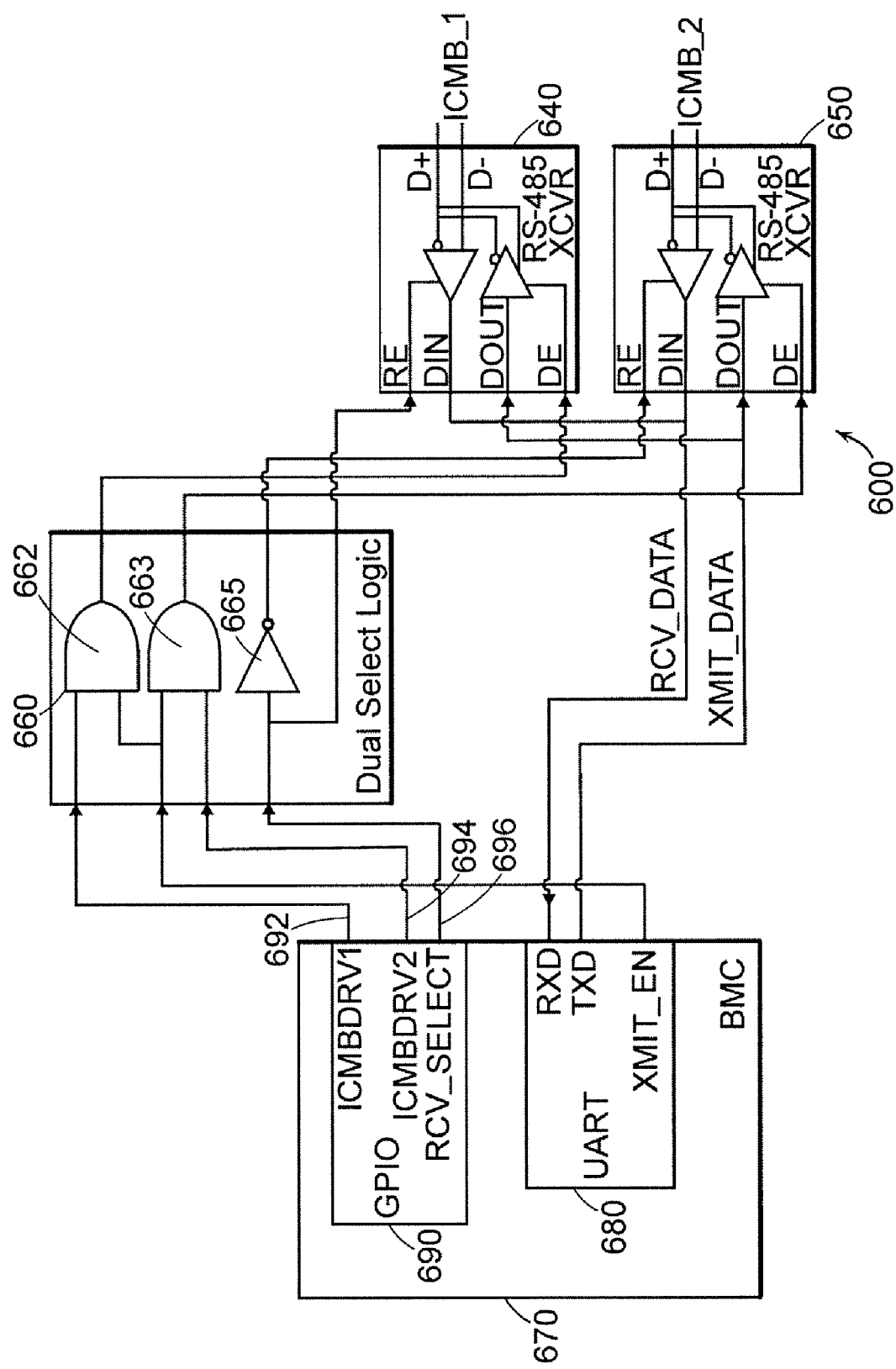
FIG. 3C is a circuit diagram of a system for connecting to two redundant busses according to preferred embodiments of the invention.

FIGS. 3B and 3C depict parts of the system of FIG. 3A in more detail. FIG. 3B is a circuit diagram for a system connecting a node to a single serial bus, using RS-485 commodity components. FIG. 3C is a circuit diagram of an interface logic that utilizes RS-485 commodity transceivers and standard logic and connects a node to two redundant busses in accordance with a preferred embodiment of the invention.

More specifically, FIG. 3B is a circuit diagram of a system 600A connecting a node to a single serial bus. System 600A is designed in accordance with the RS-485 standard and uses readily available commodity transceivers. It includes one commodity transceiver 610 connected to the bus (not shown), and the BMC 620 of the node.

The BMC includes a UART unit 630. The UART unit has three terminals, a receive-data (RXD) terminal 632, a transmit-data (TXD) terminal 634, and a transmit-enable (XMT_EN) terminal 636.

The transceiver 610 includes a receiver 614 and a transmitter 615. It also has a data-in (DIN) terminal 617, a receive-enable (RE) terminal 616, a data-out (DOUT) terminal 618, and a drive-enable (DE) terminal 619.

Receiver 614 has two input terminals 613a and 613b which are connected to the signal wires of the bus via wires 611a and 611b. Receiver 614 also has an output terminal connected to the DIN terminal 617. Receiver 614 is also connected to the receive-enable terminal 616.

Transmitter 615 has an input terminal connected to the DOUT terminal 618 and two output terminals 628a and 628b which are connected to the signal wires of the bus via wires 611a and 612b. The transmitter 615 is also connected to the DE terminal 619.

Typically the UART transmits binary signals to the transceiver through its TXD terminal and also enables the transceiver to transmit the signal out through its XMT_EN terminal. The transceiver transforms these signals into differential signals and transmits them to the bus through its output terminals. On the other hand, typically the RE terminal is set such that transceiver is always ready to receive differential signals on the bus. The transceiver transforms these signals into binary signals and transmits them to the UART.

Output data originating from the node, take the form of serial binary signals in the UART and are transmitted to the signal wires of the bus in the form of differential signals. The binary signals are sent from the TXD terminal 634 of the UART to the DOUT terminal 618 of the transceiver. The transmitter 615 receives these binary signals and transforms them into differential (bus) signals on its two output terminals 628a and 628b. These differential signals, in the form of potential differences in accordance with the standard RS-485, are then sent to the signal wires of the bus through wires 611a and 611b.

Transmitter 615 transforms the binary signals into differential signals only when the DE terminal 619 is set at positive voltage Vcc (representing a binary value "1"), and otherwise it does not create any differential signals on its output terminals. Whenever the UART is transmitting data out of TXD terminal 634, it enables the transmission by setting the potential of DE terminal 619 to "1" through the XMT_EN terminal connected to the DE terminal.

Input data from the bus are in the form of differential signals and are transmitted to the UART in the form of serial binary signals. Receiver 614 receives these input differential signals from the bus through its input terminals 613a and 613b and transforms them into a serial binary signal on its output terminal connected to the DIN terminal 617 of the transceiver. These binary signals are carried to the RXD terminal 632 of the UART which is connected to the DIN terminal.

Receiver 614 transforms the differential signals into binary signals only when the RE terminal 616 of transceiver is set at a voltage Vcc (representing the binary value "1"), and otherwise does not create any signal on its output. When transceiver is in receive mode, which is its normal mode of operation, the RE terminal of transceiver is constantly set to Vcc and the transceiver stays ready to listen to and transform the differential signals.

FIG. 3C is a circuit diagram of interface logic 600 which connects a node to two redundant busses in accordance with a preferred embodiment of the invention. The interface logic 600 includes two transceivers 640 and 650, a Dual Select Logic unit 660, and the BMC 670.

Transceivers 640 (transceiver 1) and 650 (transceiver 2) are commodity transceivers similar to the transceiver 610 in system 600A of FIG. 3B, and are respectively connected to ICMB busses ICMB_1 and ICMB_2, which are not shown.

The BMC 670 is also a commodity BMC, included as part of the node. It includes a UART 680 and a General Purpose Input/Output (GPIO) unit 690. The UART is similar to the UART in FIG. 3B. The GPIO includes three terminals, an ICMB_Drive_1 (ICMBDRV1) terminal 692, an ICMB_

Drive_2 (ICMBDRV2) terminal 694, and a receive_select (RCV_SELEC) terminal 696. These GPIO terminals and their outputs are used to control which transceiver to use for receiving or for transmitting the signals.

The Dual Select Logic unit 660 includes two AND gates 662 and 663 and an inverter 665. The inputs of the AND gate 662 are connected to the ICMBDRV1 and XMIT_EN terminals of BMC, and its output is connected to the DE terminal of transceiver 640. The inputs of the AND gate 663 are connected to the ICMBDRV2 and XMIT_EN terminals of BMC, and its output is connected to the DE terminal of transceiver 650. The input of the inverter 665 is connected to the RCV_SELEC terminal and its output is connected to the RE terminal of transceiver 650.

Moreover, the RCV_SELEC terminal is connected to the RE terminal of transceiver 640. The RXD terminal is connected to the DIN terminals of both transceivers and the TXD terminal is also connected to the DOUT terminals of both transceivers.

The GPIO and UART terminal outputs are used to control when and on which bus to transmit out the data. In order to enable the transceiver 1 (640) to transmit data out, the signal at XMT_EN of UART as well as the ICMBDRV1 terminal of the GPIO must be set to "1". Similarly, to enable the transceiver 2 (650) to transmit data out, the signal at XMT_EN of UART as well as the ICMBDRV2 terminal of the GPIO must be set to "1". Typically all three terminals XMT_EN, ICMB-DRV1, and ICMBDRV2 are set to "1" and thus the signals sent via the TXD terminal of the UART are sent to both transceivers, transformed to differential signals and transmitted on both busses. If needed, the system can set the "drive" mode to sending signals only on one of the busses, by disabling transmission on either of the busses. This can by done by setting the signal on the corresponding ICMBDRV terminal to "0". The system can also disable transmission altogether by setting either both ICMBDRV1 and ICBMBDRV2 to "0" or by alternatively setting XMT_EN to "0".

Output data originating from the node, take the form of serial binary signals in the UART and are typically transmitted to both busses in the form of differential signals. The binary signals are sent from the TXD terminal to the DOUT terminals of both transceivers. On each transceiver, if its DE terminal is set to "1", the binary signal is then transformed into a differential signal and is sent to the bus connected to that transceiver. The DE terminal of each transceiver is utilized to enable or disable the transmit of output data on the corresponding transceiver. Specifically in order to enable transmitting data out via transceiver 640, the system must set both the voltage of XMIT_EN terminal and that of ICMB_Drive_1 terminal to binary signal "1", such that the output of the AND gate 662 and thus the DE terminal of transceiver 640 are set to "1". Similarly in order to enable transmitting data out via transceiver 650, the system must set both the voltage of XMIT_EN terminal and that of ICMB_Drive_2 terminal to binary signal "1", such that the output of the AND gate 663 and thus the DE terminal of transceiver 650 are set to "1". In the normal mode of operation, the system sets both of ICMB_Drive_1 and ICMB_Drive_2 terminals at value "1" such that when UART is sending signals, and sets the XMIT_EN to "1", the signals will be sent out of both transceivers and both busses. Moreover the system can stop the transmission of the output data from the UART to either of the two busses by setting the signal on the corresponding ICMB_Drive terminal of GPIO 690 to "0".

The GPIO terminal outputs are also used to select a bus and transmit in the data from that bus. In order to enable the transceiver 1 (640) to transmit data in, the RCV_SELECT must be set to "1", which also disables transceiver 2 (650) from transmitting data in. On the other hand, to enable the transceiver 2 (650) to transmits data in, the RCV_SELECT must be set to "0", which also disables transceiver 1 (640) from transmitting data in. At any time, the system selects one of the two transceivers for receiving data and sets the signal on RCV_SELECT accordingly.

Input data from each bus is in the form of potential differences between the two signal wires of the bus. At each time, the system selects one of the two busses and listens to it, such that the signals from the selected bus are transformed and transmitted to the UART 680 in the form of binary signals. The system selects one of the two busses by setting the voltage of the RCV_SELEC terminal to either "1" or "0". When the system sets this voltage to 1, the RE terminal of transceiver 640 will be set to 1, and thus transceiver 640 will be enabled to transform the differential signals received on its bus (ICMB_1) into binary signals and send them through its DIN terminal RXD terminal. At this time the output of the inverter 665 will be 0, and thus the RE terminal of transceiver 650 will be set to 0, and transceiver 650 will be disabled from transforming signals received from its bus (ICMB_2). Conversely, when the system sets the voltage of RCV_SELEC terminal to 0, the RE terminal of transceiver 640 will be set to 0 and RE terminal of transceiver 650 will be set to 1. In this case, transceiver 640 will be disabled and transceiver 650 will be enabled, and only signals received on the bus ICMB_2 connected to transceiver 650 will be transformed sent to the RXD terminal.

The system also utilizes a clock on BMC 680 and programs running on the BMC firmware according to algorithms explained earlier to perform health checks on the busses and to make decisions on which bus to listen to or when to switch the bus it is listening to.

Figure 4:
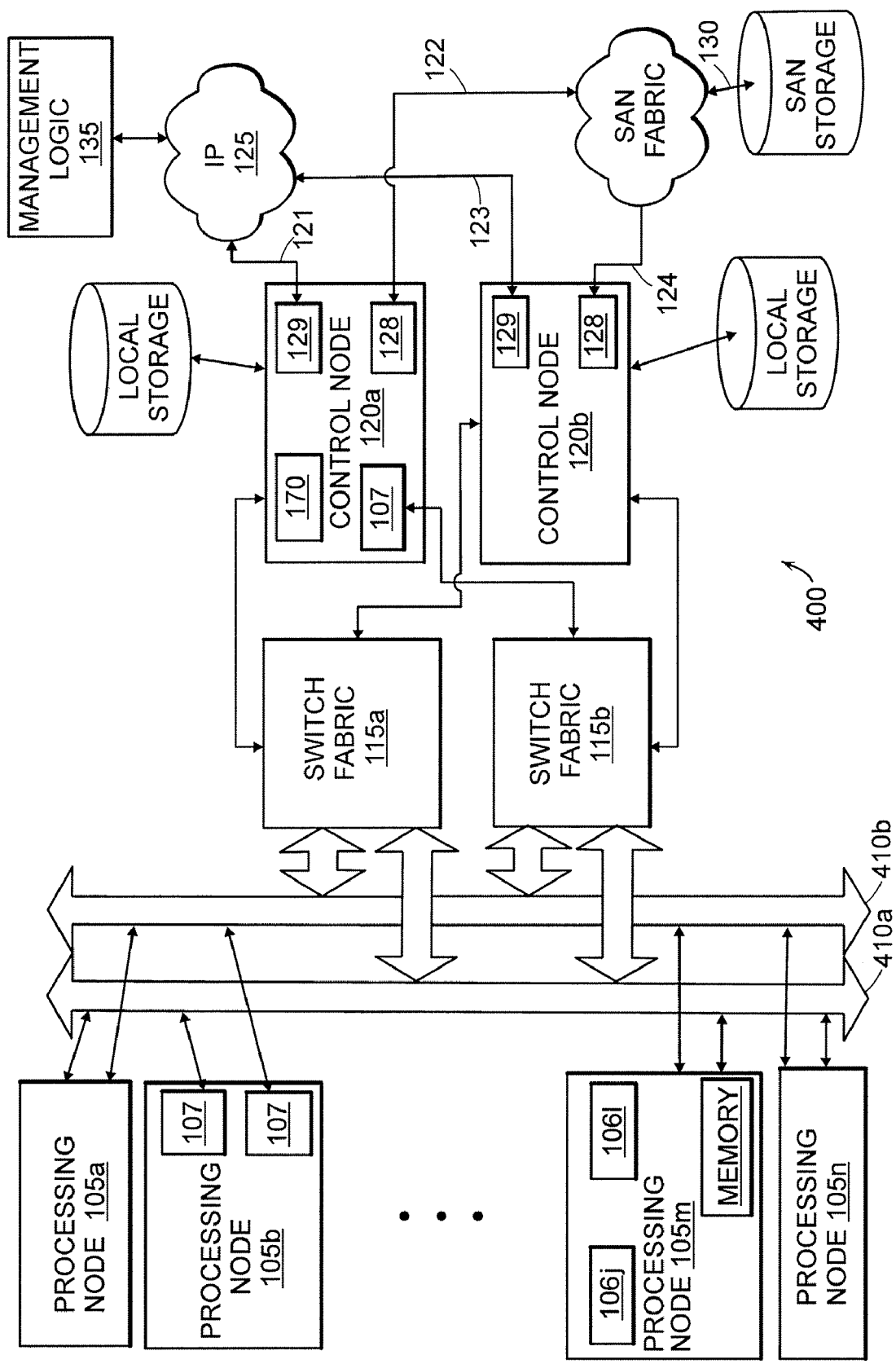
FIG. 4 is a system diagram illustrating a hardware implementation according to some embodiments of the invention.

FIG. 4 is a system diagram illustrating a hardware implementation 400 employing some embodiments of the invention. System 400 is explained in detail in U.S. Pat. No. 7,231,430 entitled "RECONFIGURABLE VIRTUAL PROCESSING SYSTEM, CLUSTER, NETWORK AND METHOD". The hardware platform 400 includes a set of processing node nodes 105*a-n* connected to switch fabric nodes 115*a,b* via high-speed, interconnects 410*a,b*. The switch fabric nodes 115*a,b* are also connected to at least one control node 120*a,b* that is in communication with an external IP network 125 (or other data communication networks), and with a storage area network (SAN) 130. The processing nodes have been enabled to communicate utilizing two redundant ICMB busses (not shown in this figure) according to a preferred embodiment of the invention.

Figure 5:
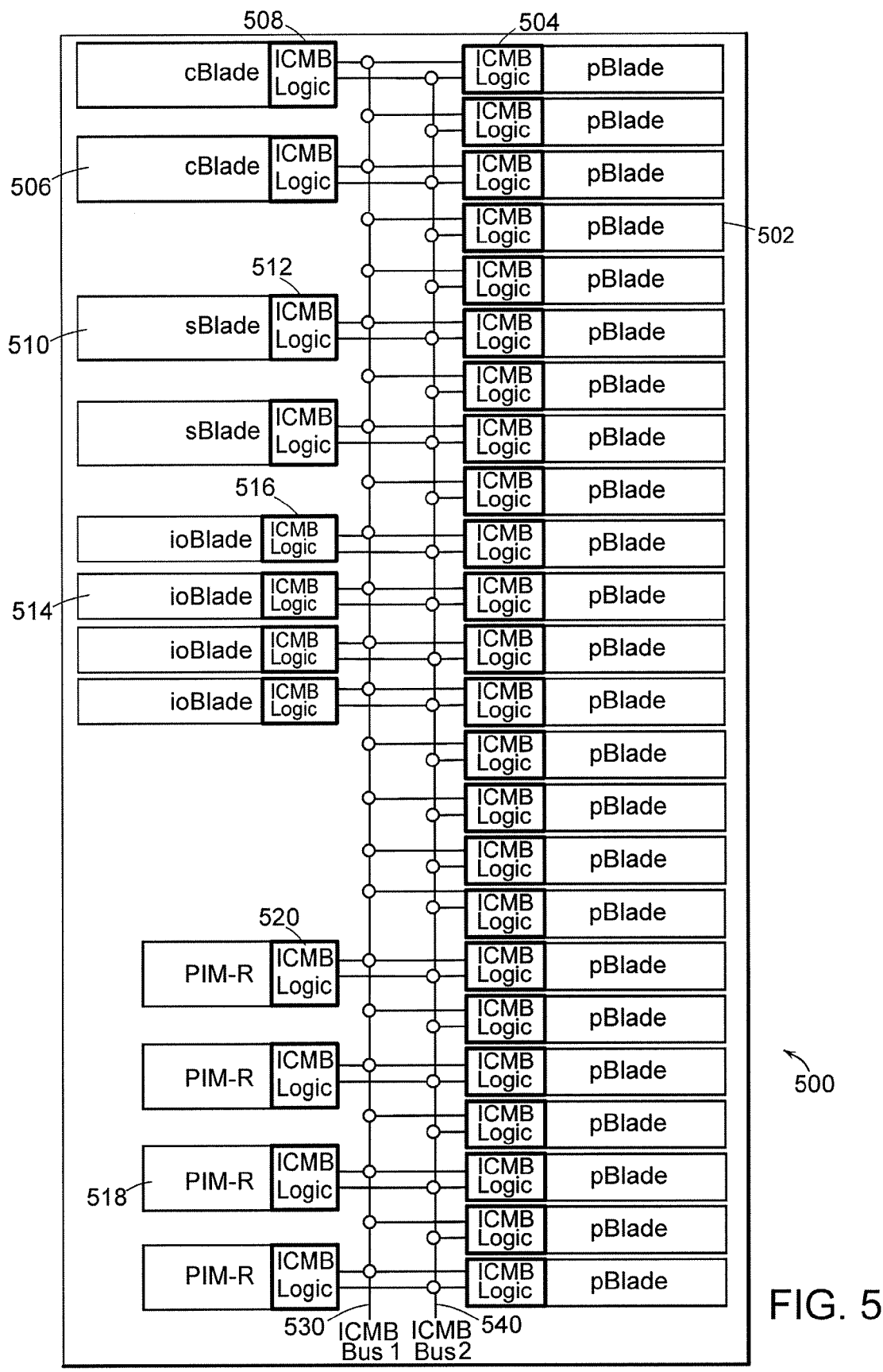
FIG. 5 is a system diagram for a system implemented according to preferred embodiments of the invention.

FIG. 5 is a system diagram for a system 500 implemented according to a preferred embodiment of the invention. System 500 shows the ICMB connections not shown in FIG. 4. It contains two redundant ICMB busses 530 and 540, multiple pBlades 502, ioBlades 514, PIM-R nodes 518, two cBlades 506, and two sBlades 510. Each of the blades is connected to each of the two ICMB busses.

Each pBlade 502 is a processing node, and includes a board that has one or more (e.g., 4) processors, one or more network interface cards (NICs), and local memory. Each pBlade also includes an ICMB Logic 504, designed according to a preferred embodiment, to connect the pBlade to the two redundant busses.

Each cBlade 506 is a control node, and contains a single board that includes one or more processors, local memory, and local disk storage. Each cBlade also includes an ICMB Logic 508, designed according to a preferred embodiment of the invention to connect the cBlade to the two redundant busses.

Each sBlade 510 is a switch fabric card. Each sBlade also includes an ICMB Logic 512, designed according to a preferred embodiment of the invention to connect the sBlade to the two redundant busses.

Each ioBlade 514 is a board specialized as an Input-Output interface, and it also includes an ICMB Logic 516, designed according to a preferred embodiment of the invention to connect the ioBlade to the two redundant busses.

Each PIM-R (Power Input Module-Redundant) node 518 is a module that is used to manage the AC input and it also includes an ICMB Logic 520, designed according to a preferred embodiment of the invention to connect the PIM-R node to the two redundant busses.

Each ICMB bus contains a set of twisted wire pairs that are daisy-chained through every slot of the chassis and connect all the nodes, including the cBlades, pBlades, sBlades, ioBlades and PIM-R hosts.

All nodes in system 500 utilize the two ICMB busses to communicate with each other. Each signal sent on the busses can be a request or a response to a request, driven (sent) by a node. pBlades and sBlades can typically drive ICMB responses on both busses and they typically do not drive ICMB requests. The cBlades typically have the capability to drive on either both busses or an individual bus for request and response traffic. This selective driving feature can also be added to ioBlades and sBlades. On the receiving side each blade can receive (listen) on one of the two busses at any given time.

The specific logic needed for connecting to the two busses, including selection of the bus to listen to, driving the busses, and health checks, can be performed by ICMB logic units 504, 508, 512, 516, and 520. In some preferred embodiments of the invention these ICMB logic units of different nodes can be identical to each other. In other embodiments of the invention the ICMB logic can be specialized based on the role of the node. One of the functions system 500 and the associated protocol can perform is preventing the insertion of a blade with bad ICMB hardware from causing a widespread outage in the frame by crashing the ICMB bus. Each node can perform the low level function of determining whether or not there is a bad ICMB bus. To accomplish this the ICMB logic in the node can detect that a bus has been "compromised" and switch (fail over) to the other bus. To allow this to occur in a timely manner, there can be a guaranteed minimum traffic on the ICMB to allow for this detection.

The guaranteed minimum traffic on each bus can be generated by the ICMB logic on the cBlades in the form of broadcast heartbeats. At the end points, each cBlade will typically generate heartbeat broadcast commands on both ICMB busses at a rate controlled by the cBlade software. The rate will be determined so that "unnecessary" failovers do not occur. For example, in some preferred embodiments, the heartbeat interval is chosen to be one minute, while the timeout interval is chosen to be two minutes. These broadcast commands will serve as a keep alive on the bus from which each end node is receiving signals.

The heartbeats can also be utilized to send messages to one node (unicast message), or a group of nodes (multicast message) to maintain, set or change the bus to which each is listening. This may for example allow a global change in the bus to which all nodes are listening.

The ICMB logic in each node can be listening to one of the busses based on its mode of operation. The ICMB logic can support multiple modes of operation. According to some preferred embodiments, these modes include i) Use Channel 1; ii) Use Channel 2; iii) Prefer Channel 1; iv) Prefer Channel 2; and v) Channel Search.

Each node will start or switch to a mode, based on its present mode, its history (e.g. whether it ever encountered a failure on a bus), and some external stimuli, e.g. the command received from the control node through a broadcast or unicast message. In some preferred embodiments, the following commands are supported by the broadcast mechanism sent by the control node: i) Continue in current mode, ii) Switch mode to Use Channel 1, iii) Switch mode to Use Channel 2, iv) Switch mode to Prefer Channel 1, v) Switch mode to Prefer Channel 2.

When each node receives the broadcast command it may make a change in its operating mode based on the command and its present mode. When a node receives these same commands through unicast traffic (directed to that specific node), its ICMB logic will switch its operating mode regardless of any previous history.

According to some preferred embodiments, each node typically switches to a "Prefer Channel 1" or "Prefer Channel 2" mode, when it receives a "Switch mode to Prefer Channel 1" or "Switch mode to Prefer Channel 2" message, respectively. When operating in one of the "Prefer" modes, each ICMB logic will individually monitor the traffic being received on the preferred bus (channel) and make its own decisions on whether or not to fail the current bus. Each ICMB logic will monitor the preferred ICMB bus for broadcast commands and valid unicast commands. The receipt of either will serve to indicate that the current selected receive bus is operational. The absence of valid traffic for a specified interval will constitute a bus failure and the BMC will failover its receiver to the other bus. Once failed over, the ICMB logic typically will not fail back to the previous bus unless directed through a unicast command to do so. When the ICMB logic in a node fails over to a different bus, it will log a SEL (system event log) message in its own logs to indicate the failure. In some preferred embodiments, the control node periodically checks the individual logs of other nodes and, if it detects a SEL message, it will trigger actions to diagnose and address the problem.

In some preferred embodiments, each node typically starts in the "Channel Search" mode every time the system is powered up. When operating in "Channel Search" mode, the ICMB logic will operate similar to the "prefer" mode with two exceptions; the ICMB logic will fail back and forth between busses based on the receive timeout, that is if it does not receive valid traffic on its presently selected bus within a pre-defined receive timeout interval, it will fail over to the other bus. The time out interval in "Channel Search" mode may or may not be the same as the time out interval in the other modes. If no valid traffic is found on the current bus then the ICMB logic will swap busses. This bus swapping will continue until valid traffic, either broadcast or unicast, is received on some bus. Once this occurs the ICMB logic will remain listening on that bus until directed to do otherwise. In this mode, even when the ICMB logic swaps busses, it will not log SEL messages.

When operating in the two "Use" modes, the ICMB logic is typically forced to only listen on the specified bus. No failover checking is done in these modes. The logic of a node can support a command to report its current operating mode so that the system can determine what mode each individual node is operating in. The status of which bus is currently being used should also be included in the response to the command Get Blade State, which is one of the commands used in chassis management performed via ICMB. All blades can default to Channel Search and all blades will power up and default to drive both busses.

In some embodiments, the ICMB logic and the operating system support additional commands. These commands include the following:

i) Set ICMB Receive Mode to control the ICMB receivers;
ii) Set ICMB Drive Mode to specify which busses to drive;
iii) Set Broadcast Operating Mode to specify which mode to advertise in the broadcast commands;
iv) Set Failover Timeout to tell each node what failover time to use;
v) Set Broadcast Interval to determine what rate to send broadcast messages;
vi) Start/Stop Broadcast.

Additionally, one of the chassis management commands to the nodes, for example the GET_BLADE_STATE, can be modified to return the current receive bus (bus 1 or 2) and the current drive busses (bus 1, 2 or both) of the corresponding node.

In some preferred embodiments, the system may use the "Set ICMB Drive Mode" for the cBlades, for example during diagnosis operations. Following this command, the cBlade will switch to transmitting the heartbeats (drive) only on one of the busses and leave the other bus silent. Consequently, after the timeout period, all healthy nodes listening to that bus, detect a lack of heartbeat, and fail over to the other bus. At that point, no node will be listening to the silent bus. The system can thus test whether the health check mechanism on each node is operating correctly.

The aforementioned mechanism and systems can be generally applied to different types of nodes and different types of busses. Moreover these mechanisms and systems can be utilized for creating a fault-tolerant system employing more than two busses. Moreover, in some embodiments, each interface logic can perform health checks by executing error checking on the received stream of bits in the signal by calculating the CRC (cyclic redundancy code) of the bits and comparing that value with the CRC value included in the same stream. Alternatively an interface logic can evaluate any other type of checksum or function of the signal as the acceptance criteria.

It will be appreciated that the scope of the present invention is not limited to the above described embodiments of the invention but rather is defined by the appended claims; and that these claims will encompass modifications of and improvements to what has been described.

What is claimed is:

1. A fault-tolerant communication system for communication between a control module and a processing module, wherein the control module and the processing module are each designed to be connected to a single RS-485 bus, said fault-tolerant communication system enabling the control module and the processing module to selectively communicate via at least two redundant half-duplex, multipoint, differential RS-485 busses and comprising:

each of the control and the processing modules having:
a first RS-485 transceiver connected to a first RS-485 bus;
a second RS-485 transceiver connected to a second RS-485 bus;
selector logic responsive to a control signal for selecting one of the first and the second busses to receive signals from and for transmitting the received signals to the respective module; and
software logic executable on a baseboard management controller (BMC) chip, said software logic including control logic for monitoring the health of the respectively selected bus and for providing the control signal to the respective selector logic, wherein the control module delivers test signals within a predetermined time period on the first and second busses to test the electrical connectivity of each of the two busses,
wherein the selector logic of the processing module monitors test signals received on the respectively selected bus and causes selection of a bus other than the respectively selected bus, if it does not receive test signals on the respectively selected bus within the predetermined time period; and
wherein the test signals are able to cause a voltage difference on a healthy RS-485 bus to transit from a quiescent state to an active state in which the voltage difference represents a binary 0 or a binary 1 signal.

2. The fault-tolerant communication system of claim 1, wherein each selector logic receives signals from the respective module and transmits a first copy of the signals to the first RS-485 transceiver for delivery on the first RS-485 bus and a second copy of the signals to the second RS-485 transceiver for delivery on the second RS-485 bus.

3. The fault-tolerant communication system of claim 1, wherein each of the first and the second RS-485 busses is an Intelligent Chassis Management Bus (ICMB) utilized by the module to transmit and receive system health and management signals.

4. The fault-tolerant communication system of claim 3, wherein the system health and management signals include information about the module selected from the group consisting of board-number information, temperature information, fan-speed information, power-consumption information, and on/off status information or a command selected from the group consisting of turn-on command, and turn-off command.

5. A method of providing fault-tolerant communication between a control module and a processing module, wherein the control module and the processing module are each designed to be connected to a single RS-485 bus, said method enabling the control module and the processing module to selectively communicate via at least two redundant half-duplex, multipoint, differential RS-485 busses and comprising the steps of:

each of the two modules delivering signals on each of the two busses, by transmitting a first copy of the delivered signals on the first bus; and a second copy of the delivered signals on the second bus;
each of the two modules selecting one of the first and the second busses to receive signals from;
the control module delivering test signals within a predetermined time period on the first and second busses to test the electrical connectivity of each of the two busses;
the processing module monitoring test signals received on the respectively selected bus and switching to receiving signals from a bus other than the respectively selected bus, if it does not receive test signals on the respectively selected bus within the predetermined time period; and
wherein the test signals are able to cause a voltage difference on a healthy RS-485 bus to transit from a quiescent state to an active state in which the voltage difference represents a binary 0 or a binary 1 signal.

6. The method of claim 5, wherein each of the first and the second RS-485 busses is an Intelligent Chassis Management Bus (ICMB) utilized by each of the two modules to transmit and receive system health and management signals.

7. The method of claim 6, wherein the system health and management signals include information about the processing module selected from the group consisting of board-number information, temperature information, fan-speed information, power-consumption information, and on/off status information or a command from the control module selected from the group consisting of turn-on command, and turn-off command.

8. The method of claim 5, further comprising the steps of the control module delivering a switch-command signal on each of the two busses and the processing module receiving the switch-command signal on the respectively selected bus and switching to receiving signals from a bus other than the respectively selected bus.

\* \* \* \* \*